June 3, 1958  A. P. VIRET  2,837,053
INDICATING APPARATUS
Filed Jan. 17, 1956  2 Sheets-Sheet 1
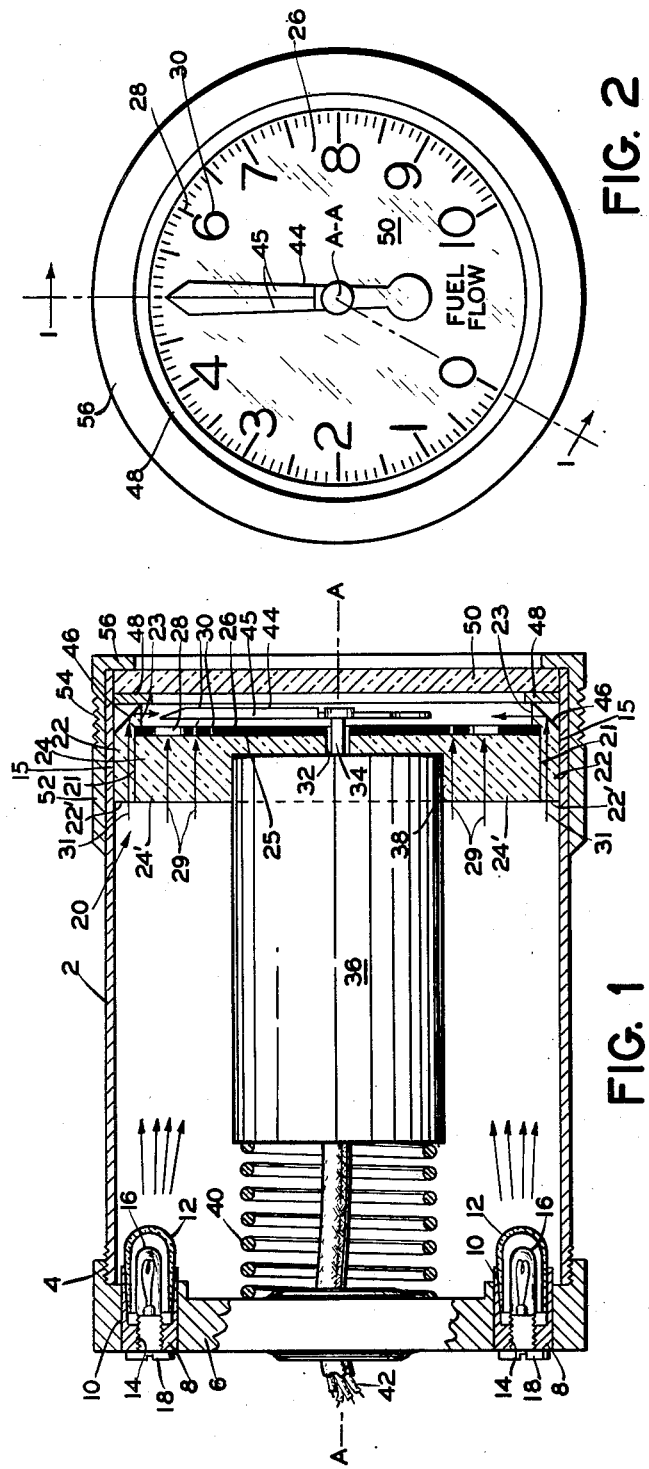
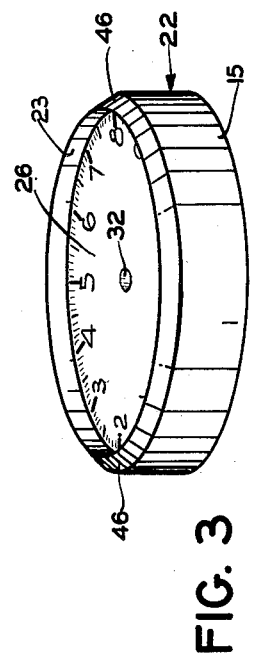
INVENTOR.
ANDRE P. VIRET
BY Tyler & Roundy
ATTORNEY June 3, 1958 — A. P. VIRET — 2,837,053
INDICATING APPARATUS
Filed Jan. 17, 1956 — 2 Sheets-Sheet 2

INVENTOR.
ANDRE P. VIRET
BY Tyler & Roundy
ATTORNEY

United States Patent Office 2,837,053
Patented June 3, 1958

2,837,053
INDICATING APPARATUS

Andre P. Viret, Ridgewood, N. J., assignor to Bendix Aviation Corporation, Teterboro, N. J., a corporation of Delaware Application January 17, 1956, Serial No. 559,607

3 Claims. (Cl. 116—129)

This invention relates to indicating apparatus and particularly to indirectly illuminated indicating devices and integral lighting arrangements for instruments wherein it is desired to illuminate indirectly both the indicia which is on a light-conducting dial and one or more indicator elements or pointers which are associated with the dial. The invention is especially applicable to indicating instruments suitable for use both in daylight and also in a darkened environment requiring so-called "night vision."

Heretofore, the conventional approach to the problem of providing satisfactory indirect illumination for indicating apparatus has involved the mounting of one or more lamps or light reflectors in corners provided in an instrument bezel in alignment with the edge of the transparent dial plate so that indirect illumination of the indicia is produced by light rays which enter the edge of the dial plate in radial directions and are internally transmitted and reflected through the transparent dial material so as to impinge upon the indicia, other light rays passing directly from the lamp across in front of the dial face so as to illuminate the pointer. Such a construction is disclosed for example in the co-pending application by myself and W. R. Polye, Ser. No. 351,856, filed April 29, 1953, now U. S. Patent No. 2,768,606, granted October 30, 1956, and assigned to the same assignee as the present application.

It has previously been proposed to encompass the dial face and the zone of operation of the pointer by a prismatic light-conducting ring which lies in a parallel plane in front of the dial face so that light rays introduced into the ring from in front of the dial pass from the ring radially inward across the dial face to illuminate the pointer, or to illuminate both the pointer and the dial face if the dial is opaque. Such constructions are disclosed and claimed for example in U. S. Patents 2,140,972 and 2,259,910 to G. V. Rylsky, granted December 20, 1938 and October 21, 1941, respectively, and assigned to the same assignee as the present application.

However, the mounting of lamps in a bezel in alignment with the edge of the dial has been found to be unacceptable in certain applications such as aircraft panel installations, since such lamp location increases the outside dimensions of bezel and casing. In one prior unit employing a prismatic edge portion or rim integral with the light-conducting dial plate and extending in front of the dial face, it was proposed to locate the lamp behind such edge portion so that illumination of the indicia and pointer was accomplished solely by those light rays from the lamp which entered the back of the edge portion, certain of these entering rays being reflected from the rim surface of the edge portion radially into the main body portion of the dial plate for internal transmission to illuminate the indicia, the balance of the entering rays being reflected from the rim surface radially inward across the dial face to illuminate the pointer, the rear of the dial being completely shielded by an opaque backing member so that no light would be permitted to enter the rear of the dial. In such prior arrangements, much of the light emitted from the lamps either is absorbed by the backing member or escapes in directions away from the dial and is absorbed and wasted in the mechanism behind the dial, which places a distinct limitation upon the quantity of light rays available for illuminating the indicia and pointer with the intensity and uniformity required. Moreover, the fact that some of the light rays entering the prismatic edge portion are thereafter diverted for illuminating the indicia results in a further reduction in the quantity of light rays available for illuminating the pointer with the adequate intensity and uniformity required.

It is an object of the present invention to provide improved indicating apparatus.

It is another object of the invention to improve the illumination of indicating devices and particularly to improve indirect illumination or integral lighting for indicating apparatus.

It is another object of the invention to provide novel means for producing indirect illumination or trans-illumination of relatively high intensity or brightness for the indicia and indicator elements of indicating apparatus.

It is a further object of the invention to provide novel means for producing substantially uniform indirect illumination or transillumination for the indicia and indicator elements of indicating apparatus.

It is a further object of the invention to provide a novel self-contained indicating instrument having a relatively small outside diameter wherein the source or sources of illumination is located rearwardly of the dial surface for indirectly illuminating the dial indicia and indicator elements located in front of the dial face.

It is a still further object of the invention to provide a novel indicating instrument of relatively small outside diameter which does not incorporate an instrument bezel and may be clamped or otherwise directly mounted on an instrument panel in a compact arrangement along with a series of other similarly mounted instruments.

The foregoing and other objects, features and advantages of the present invention will become apparent hereinafter from a consideration of the detailed description which follows taken together with the accompanying drawings wherein certain embodiments of the invention are illustrated by way of example.

In accordance with one aspect of the invention there is provided indirectly illuminated indicating apparatus comprising a dial structure composed of radiant energy-transmitting material, for example light-transmitting material, and having a main body portion with a front dial face which is for the most part impervious, for example opaque, to the radiant energy rays and which is apertured with indicia capable of passing or transmitting the rays of radiant energy, at least one indicator member or pointer disposed in front of the dial face for cooperation with the indicia, means for producing relative movement or relative rotation between the indicator member and the indicia, the dial structure having a marginal or peripheral lighting portion which may be annular and is provided with an extension which extends forwardly ahead or in front of the dial face and which is constructed, for example by selected beveling, so as to project a first group of received rays of radiant energy out of the marginal portion across in front of the dial face to strike the visible portions of the indicator member to illuminate the same, and means including at least one radiant energy source located rearwardly of or behind the main body portion and its dial face, with unobstructed straight-line paths between the source and the rear of the main body portion, for directing or causing the first group of rays to pass into the marginal portion of the dial structure for illuminating the indicator member and for directing or causing a second group of rays of radiant energy to pass into the rear of the main body portion for internal transmission through the main body portion so that such rays progress in a transverse generally axial direction and impinge upon or escape out through the indicia into the eyes of the observer, thereby illuminating the indicia. Where design considerations require illumination of the indicator member with maximum intensity for example, the aforesaid dial structure may comprise an assembly of two or more members. Thus, the dial structure may include an indicia-bearing main dial member or dial plate of light-transmitting or light-conducting material and a separate marginal lighting member or lighting ring of similar material which has a forward extension extending ahead of the main dial member for projecting the first group of rays onto the indicator member. Where other design considerations prevail, the marginal or peripheral portion and the main body portion may instead be integral parts of a unitary dial structure rather than separate members.

In the drawings wherein like reference characters refer to like elements throughout the various views, Fig. 1 is partial sectional view along the line 1—1 of Fig. 2 of one form of indirectly illuminated indicating instrument in accordance with the present invention;

Fig. 2 is a front plan view of the instrument of Fig. 1;

Fig. 3 is an isometric view of the dial structure of Figs. 1 and 2;

Figure 4:
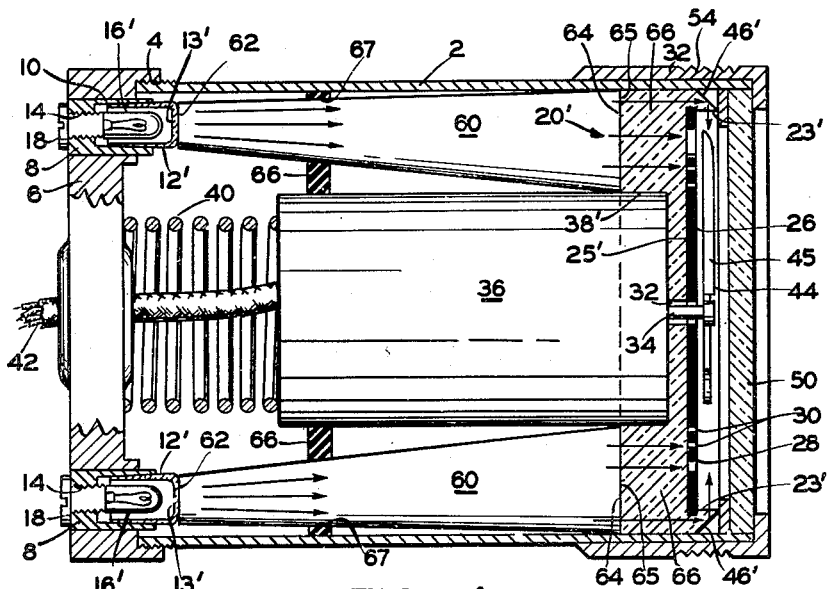
Fig. 4 is a sectional view similar to Fig. 1 of a modification in accordance with the invention.

Turning to Figs. 1 and 2, there is provided an indicator unit having a cylindrical metal housing 2 which is threaded at its rear end 4 to receive a threaded metal cover plate 6. Solder may be provided at 4 if an hermetic seal is desired. Soldered or otherwise secured in a pair of apertures in plate 6 is a pair of cup-like metal members 8 which may be composed of a metal alloy such as "Kovar." A dome-shaped glass or transparent plastic envelope 12 is secured to the rim 10 of each member 8 to provide an hermetic seal. Each member 8 is threaded at 14 to receive the threaded base portion of a respective lamp 16 so that the bulb of the lamp is located within the envelope 12, the slotted base 18 of each lamp being flanged so as to abut against the end plate 6. Several circumferentially spaced lamps may be employed if desired. The electrical socket and terminal connections for the lamps are omitted for simplicity. It will be noted that the lamp housings 8, 12 advantageously permit the lamps to be readily inserted and removed without disturbing the hermetic seal of the instrument. If desired, suitable shields or reflectors may be provided around the lamps so as to concentrate more of light rays in an axial direction.

Shown generally at 20 is a dial structure including a marginal lighting portion in the form of a lighting ring 22 positioned radially by having its outer annular surface 15 fitted within the inner side wall of housing 2, and a main body portion in the form of a circular dial plate 24 positioned radially by having its outer annular surface fitted within the inner annular wall of ring 22 at 21. Ring 22 has an annular lip portion 23 which extends radially inward a slight amount to hold dial 24 against axial movement. The ring 22 and dial plate 24 may be composed of light-transmitting or light-conducting plastic material such as methyl methacrylate. For example, "Rexolite," "Lucite" or "Plexiglas" are suitable for this purpose. All surfaces of ring 22 are highly polished. The flat front surface 25 of dial plate 24 may be covered by a layer of translucent white paint which in turn is covered by a layer 26 of opaque paint or black printer's ink. The indicia, comprising the graduations 28, the numerals 30 and the legend "Fuel Flow," are cut out of the opaque layer 26 with the white paint exposed underneath so that the indicia are light-transmitting. Alternatively the indicia may be cut or engraved in the front surface 25 of the dial plate and the resulting recesses may be filled with translucent white paint, the remaining flat surface being covered with a layer of opaque paint or black printer's ink which may be applied by a roller so as to leave the white painted indicia areas uncovered. If desired, certain portions of the rear surface 24' may be roughened or painted white to diffuse the entering light rays so as to provide more uniform indicia illumination.

As a means for supporting the actuating mechanism of the instrument without interfering with the transmission of light rays from the lamps to the dial structure, a central recess 38 is provided in the back of the dial plate 24 to receive the front end of the casing 36 of the actuating mechanism, which may be a conventional follow-up synchro device or conventional meter movement. The housing 36 and the interior of housing 2 may be painted white to provide good reflecting surfaces for those light rays which emerge from the lamps at angle oblique to the longitudinal axis of the unit and which are desired to also reach the dial structure. A compression spring 40 may be inserted between the inner end of casing 36 and the cover plate 6 to prevent axial movement of housing 36 along the central longitudinal axis A—A of the indicator unit. Suitable electrical connections 42 for the actuating mechanism and lamps are lead in through cover plate 6. The dial plate has a central aperture 32 through which extends the output shaft 34 of the actuating mechanism. Secured to the forward end of shaft 34 is a pointer 44 which may be composed of metal or of the same transparent plastic material as ring 22 and the dial plate 24. More than one pointer may be employed if desired. The pointer surfaces may be completely coated with a layer of white paint, and portions such as the tail end which are to be non-visible may be covered over with a layer of an opaque paint. The visible portions may have a triangular transverse cross-section with sloping or beveled surfaces 45.

As shown in Fig. 1, the lip portion 23 is part of a rim-like peripheral extension of the lighting ring 22 which projects ahead of the indicia-bearing dial surface and is provided with an annular 45° bevel surface 46. The bevel begins approximately at the plane which includes the opaque layer 26 or the dial face so that the bevel will not direct any light rays radially inward to escape and pass across at 21 into the body of dial plate 24 behind the dial face. In accordance with one feature, the straight-line paths between the lamps and the annular rear surface 24' of the dial plate behind the indicia are left unobstructed and the lamp filaments are spaced from the central longitudinal axis A—A of the indicator unit, for example approximately the same radial distance as are the indicia, in positions such that some of the light rays 29 from each lamp enter the rear dial surface 24' approximately directly behind the indicia and are transmitted internally to progress in a transverse generally axial direction through the dial plate 24 so as to escape from the dial plate out through the light-transmitting indicia, thereby illuminating the indicia. At the same time the lamp filaments are positioned with respect to the ring 22 so that the remaining light rays 31 from the lamps which are directed toward the dial assembly 20 enter the lighting ring 22, by entering its annular rear surface 22' in the particular construction shown, and are transmitted internally through the ring until they strike the annular 45° bevel surface 46 from which they are internally reflected so as to be projected out of an annular exit surface 23 on the lip portion of ring 22 in generally radial directions inwardly across the dial face and approximately parallel to the dial face until they strike the white-painted sloping surfaces 44 and 45 of the pointer for reflection in a diffused manner into the eyes of the observer.

A flat metal ring 48 is sandwiched between the lighting ring 22 and the transparent cover glass 50 to serve as a spacer and also as a stray light shield to intercept rays of light which emerge in an oblique forward direction from the exit surface 23 toward the cover glass 50. Cover 50 may instead be composed of transparent plastic material if desired. Except for shield 48, such oblique rays would otherwise pass into the eyes of the observer as one type of glare. Where required, the inner rim portion of ring 48 may be bent at an oblique angle toward the dial surface. If desired, a second flat shield ring having approximately the same inside diameter as ring 48 may be positioned on the opaque layer 26 around the outer circumference of layer 26 so as to intercept those rays of light which emerge from the exit surface 23 in an oblique rearward direction toward the indicia and the background dial surface area adjacent to the indicia, thereby casting a shadow across the indicia and indicia background to eliminate the type of glare which would otherwise result if such light rays were permitted to reflect from the indicia and indicia background into the eyes of the observer. Such a shield arrangement is disclosed in the U. S. Patent No. 2,768,606 aforesaid.

In order to provide an hermetic seal for the instrument a metal ring 52 is soldered to the housing 2 and is provided with a flange portion 54 which may be cemented or soldered to the cover glass 50. A series of annular grooves 56 are cut in ring 52 so that ring 52 is gripped tightly for support within the associated aperture in the instrument panel (not shown).

In the dial structure of Fig. 1 the bevelled surface 46 for illuminating the pointers is formed on a lighting ring 22 which is a member separate from the dial member 24. Such construction is relatively simple to manufacture and assemble in the completed indicator unit. Also, since the engaging surfaces of ring 22 and dial plate 24 are not absolutely smooth, the physical contact at 21 is not perfect or complete. Since there is no appreciable optical contact between ring 22 and dial plate 24, a negligible number of the light rays 31 in ring 22 are permitted to escape into the side of the dial plate, which would otherwise diminish the number of light rays available for projecting across the dial face to illuminate the pointer with the intensity and uniformity required. However, where other considerations prevail, the lighting ring 22 with its bevel 46 may be integral with the dial plate 24, the resulting unitary dial structure having the same general outline as elements 22 and 24 shown in Fig. 1. An integral dial structure is shown in Fig. 4 for purposes of illustration.

The modification in Fig. 4 is similar to the arrangement in Fig. 1 except that solid light conductors or pipes are provided for conducting the light rays from the lamps at the rear of the unit forward to the dial assembly. The transparent lamp housings 12' have flattened end surfaces 13' which abut against the flat rear-end surfaces 62 of respective diverging solid light-conducting rods 60. Rods 60 may be of generally conical shape and have their flat front-end surfaces 64 in abutment with the flat rear surface 65 of the unitary dial structure 65. Rods 60 may be composed of the same transparent plastic material as described in connection with the lighting ring 22 and dial plate 24 in Fig. 1. As a means for holding the rods 60 in position, there is provided an annular retaining ring 66 which may be composed of hard rubber and which is supported in the inner surface of casing 2. A pair of apertures 67 are provided in ring 66 to receive and support respective rods 60. If desired, the dial structure may instead comprise a separate lighting ring and dial plate as in Fig. 1.

Figure 5:
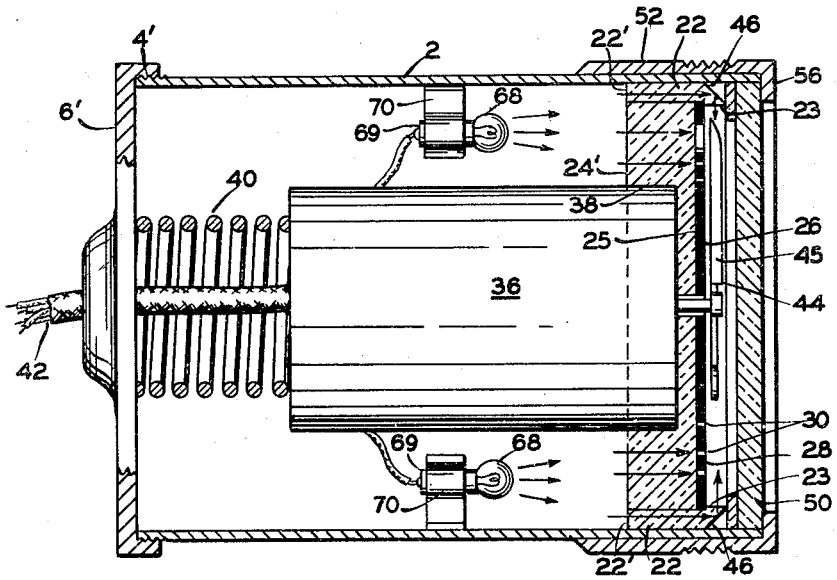
Fig. 5 is a sectional view similar to Fig. 1 of a further modification in accordance with the invention.

The modification in Fig. 5 is similar to the arrangement of Fig. 1 except that the lamps 70 are supported from the side wall of housing 2 in closer relation to the dial assembly. The lamps 68 are mounted in suitable sockets 69 which are releasably carried by flexible clips 70 secured to the inner wall of housing 2.

In my copending application Ser. No. 559,603, filed simultaneously with the present application, there is disclosed indicating apparatus similar to that disclosed in the present application but wherein the marginal lighting member, or the marginal lighting portion in the case where the dial structure is a unitary structure, is shaped in an improved manner and the lamp or lamps are relocated with respect to the dial structure to provide an improved and more compact unit. In this sense the constructions illustrated and described in the aforesaid copending application Ser. No. 559,603 are in the nature of an improvement over the constructions illustrated and described in the present application, with the present application containing claims which are generic to the embodiments disclosed in both applications.

Although certain embodiments of the invention have been illustrated and described in detail by way of example, it is to be expressly understood that the invention is not limited thereto. For purposes of illustration and simplification various shapes and relative dimensions and locations of parts have been exaggerated. For example, the overall length of the casing 2 in Figs. 1 and 4 may be shortened so that the lamp filaments are located at or forward of the rear of housing 36. Various changes may be made in the design and arrangement of parts without departing from the spirit and scope of the invention as defined by the appended claims as will now be understood by those skilled in the art.

I claim:

1. Indicating apparatus comprising a housing having a generally cylindrical portion and being hermetically sealed, a dial structure mounted inside said housing and including a ring-like lighting member of light-conducting material having an annular inner surface and having an annular outer surface fitted within said cylindrical portion of the housing, said dial structure also including a separate generally cylindrical dial plate of light-conducting material having an annular outer surface fitted within said inner annular surface of said lighting member, said dial plate having a central aperture along the central axis of the apparatus and an opaque front dial face apertured with light-transmitting indicia, at least one pointer having portions to be illuminated which are disposed in front of said dial face for cooperation with said indicia, means including a shaft extending axially through said aperture for rotating said pointer with respect to said indicia, said lighting member having a portion with an inner annular light-projecting surface which extends axially ahead of said dial face to encompass substantially said pointer, said portion of the lighting member having a beveled outer annular surface, the bevel beginning approximately at the plane including said dial face and at said cylindrical portion of the housing to reflect light rays received in said lighting member out across in front of said dial face to impinge upon said portions of the pointer to be illuminated, and a plurality of lamps positioned behind said dial plate and spaced from said central axis approximately the same distance as said lighting member and said indicia for passing a first group of light rays into the rear of said lighting member for internal transmission therethrough and reflection from said beveled surface to illuminate said pointer and for passing a second group of light rays into the portions of the rear of said dial plate approximately directly behind said indicia for internal transmission through said dial plate to illuminate said indicia, each of said lamps being enclosed within a transparent casing which is hermetically sealed to the rear end of said housing so that said lamps may be inserted and removed without destroying the hermetic seal for the housing.

2. Indicating apparatus according to claim 1 wherein said lamps are mounted at the rear end of said housing and light-piping means are provided which extend from each lamp to the rear of said lighting member and to the rear of said dial plate.

3. Indicating apparatus according to claim 1 wherein said shaft rotating means including a torque developing device enclosed within a cylindrical casing, and the rear end portion of said dial plate having an enlarged cylindrical recess symmetrical with said central aperture for receiving and supporting the front end of said casing, a spring element interposed between the rear end of said casing and an inner surface of the housing so as to bias the front end of said casing into the enlarged recess.

References Cited in the file of this patent
UNITED STATES PATENTS

| | | |
|---|---|---|
| 2,287,605 | Dickson | June 23, 1942 |
| 2,606,277 | Triplett | Aug. 5, 1952 |
| 2,637,296 | Colt | May 5, 1953 |